(12) United States Patent
Komiya et al.

(10) Patent No.: US 8,561,949 B2
(45) Date of Patent: Oct. 22, 2013

(54) ARTICULATED CABLE PROTECTION AND GUIDE APPARATUS

(75) Inventors: Shoichiro Komiya, Osaka (JP);
Kiyotake Tatsuta, Osaka (JP); Masaaki Ikeda, Osaka (JP); Takayuki Matsuda, Osaka (JP)

(73) Assignees: Tsubakimoto Chain Co., Osaka (JP);
Hitachi Cable Ltd., Tokyo (JP)

(*) Notice: Subject to any disclaimer, the term of this patent is extended or adjusted under 35 U.S.C. 154(b) by 0 days.

(21) Appl. No.: 13/362,140

(22) Filed: Jan. 31, 2012

(65) Prior Publication Data

US 2012/0228437 A1 Sep. 13, 2012

(30) Foreign Application Priority Data

Feb. 10, 2011 (JP) ................................. 2011-027372

(51) Int. Cl.
*F16G 13/00* (2006.01)

(52) U.S. Cl.
USPC ........................................... 248/73; 248/68.1

(58) Field of Classification Search
USPC .................. 248/49, 51, 65, 68.1, 73; 59/78.1; 174/72 A
See application file for complete search history.

(56) References Cited

U.S. PATENT DOCUMENTS

| | | | |
|---|---|---|---|
| 4,795,115 A * | 1/1989 | Breeden et al. ................... | 248/59 |
| 6,662,545 B1 * | 12/2003 | Yoshida ............................ | 59/78 |
| 6,858,797 B2 | 2/2005 | Sheikholeslami et al. | |
| 6,996,967 B2 * | 2/2006 | Kobayashi ....................... | 59/78.1 |
| 7,552,581 B1 * | 6/2009 | Pfeifer et al. .................... | 59/78.1 |
| 7,559,340 B2 * | 7/2009 | Ikeda et al. ...................... | 138/110 |
| 7,718,894 B2 * | 5/2010 | Blase ............................... | 174/68.1 |
| 7,942,169 B2 * | 5/2011 | Komiya et al. .................. | 138/110 |
| 7,947,078 B2 * | 5/2011 | Siegal ............................. | 623/17.11 |
| 2009/0074149 A1 | 3/2009 | Van Der Ende | |

FOREIGN PATENT DOCUMENTS

| | | |
|---|---|---|
| JP | 2005-54911 A | 3/2005 |
| JP | 4157096 B2 | 7/2008 |
| JP | 4157096 B2 | 9/2008 |
| WO | 2004049609 A2 | 6/2004 |
| WO | 2004049509 | 6/2006 |

OTHER PUBLICATIONS

Japanese Office Action dated Aug. 28, 2012 in Japanese serial No. 2011-027372.

* cited by examiner

*Primary Examiner* — Steven Marsh
(74) *Attorney, Agent, or Firm* — Woodling, Krost and Rust

(57) ABSTRACT

There is provided an articulated cable protection and guide apparatus that can securely and stably guide a large number of cables, can assure durability of articulated supporting members that operate between straight and bending postures for a long period of time, and can be easily disassembled and assembled at a machine frame-side stationary end-side connector unit or at a moving end-side connector unit. The articulated cable protection and guide apparatus comprises: a stationary end-side connector unit for affixing each stationary end of articulated supporting members, cables and a flexible belt member integrally to a machine frame-side stationary end area; a moving end-side connector unit for affixing each moving end of the articulated supporting members, cables and a flexible belt member integrally to a movable-side moving end area.

7 Claims, 12 Drawing Sheets

ARTICULATED CABLE PROTECTION AND GUIDE APPARATUS

CROSS REFERENCE TO RELATED APPLICATIONS

This application claims the foreign priority benefit under Title 35, United States Code, §119 (a)-(d) of Japanese Patent Application No. 2011-027372, filed on Feb. 10, 2011 in the Japan Patent Office, the disclosure of which is herein incorporated by reference in its entirety.

BACKGROUND OF THE INVENTION

1. Field of the Invention

The present invention relates to an articulated cable protection and guide apparatus for protecting and guiding flexible cables and hoses. The cables and hoses may be electric cables, optical fiber cables and fluid supplying hoses (referred to hereinafter as a cable or cables). The cables are used for machine tools, electronic devices, industrial robots, transportation machines and others to feed power, fluid, air and other things to those moving machines or to a moving part of the machines.

2. Related Art

If cables are to be connected to a mobile body of a machine tool, a civil engineering machine, and/or a conveying apparatus without protection in an exposed state, the cables may be damaged by causing intolerable torsion or tension when they are moved. In those circumstances, a cable protection and guide apparatus is used to support and guide the cables.

Prior art cable protection and guide apparatuses are known in which conductors, conduits for conveying gas, and supporting members include continuous material strips. The continuous material strips include a series of non-interlocked action-limited solid bodies sealed within a plurality of channels and disposed therein in parallel as disclosed in Japanese Patent No. 4157096 (Claims, Paragraphs [0031] through [0034], FIG. 21) for example.

Problems to be Solved by the Invention

In the prior art, a flexible material composing the supporting member is stainless steel or a leaf spring, the apparatus is difficult to install within a restricted space because the supporting member is unable to maintain an accurate bending radius during bending. During bending its bending radius becomes large and it may contact a nearby obstacle. When stainless steel is used as the flexible member in particular, the apparatus may breakdown and rupture as a result of fatigue and become unusable.

Because the flexible material composing the supporting member is stainless steel or made from a leaf spring, which cannot be easily cut and connected, the prior art device cannot be replaced. The prior art apparatus may cause resonance and destabilize operations such as operation between bending and straight postures because its twisting rigidity is low when it is bent.

The prior art device requires much burden and time for its production and cannot be mass-produced because pieces formed of resin must be injection-molded one at a time to the stainless steel or leaf spring.

In the prior art, while a jacket component is retained by a pair of upper and lower clamping means to handle the conductors, conduits and supporting members, the supporting members are dislocated from the jacket component or abruptly fall out of the jacket component becoming unable to securely guide the conductors or the conduits.

The prior art apparatus is difficult to assemble and disassemble because the conductors, the conduits and the supporting members cannot be removed out of a machine frame-side stationary end area or a machine movable-side moving end area separately during maintenance.

SUMMARY OF THE INVENTION

Accordingly, the present invention aims at solving the aforementioned prior art problems by providing an articulated cable protection and guide apparatus that can securely, stably and smoothly guide a cable or cables between a machine frame-side stationary end area and a movable-side moving end area. The present invention assures durability of articulated supporting members that take straight and bending postures for a long period of time. The present invention also permits easy assembly and disassembly of the machine frame-side stationary end-side connector unit or a moving end-side connector unit.

Means for Solving the Problems

In order to solve the aforementioned problems, according to a first aspect of the invention, there is provided an articulated cables protection and guide apparatus comprising:
 a cable or cables;
 the cable or cables are guided between a machine frame-side stationary end area and a machine movable-side moving end area;
 articulated supporting members;
 each of the articulated supporting members includes a stationary end and a moving end;
 each of the articulated supporting members includes a large number of synthetic resin block bodies linked with each other;
 the large number of synthetic resin block bodies linked with each other operate between straight and bending postures;
 a flexible belt member;
 the flexible belt member includes a width and a length;
 the flexible belt member includes a plurality of tubular storing portions;
 the articulated supporting members are inserted and stored in respective tubular storing portions;
 the cable or cables are inserted and stored in respective tubular storing portions;
 the articulated supporting members and the cables stored in the respective tubular storing portions are in parallel in the flexible belt member width direction;
 the cables are protected within the tubular storing portions of the flexible belt member and are guided between the machine frame-side stationary end area and a machine movable-side moving end area;
 a stationary end-side connector unit;
 a moving end-side connector unit;
 the stationary end-side connector unit integrally affixes each stationary end of the articulated supporting members, the cable or cables, and the flexible belt member to the machine frame-side stationary unit; and,
 the moving end-side connector unit integrally affixes each moving end of the articulated supporting members, the cable or cables, and the flexible belt member to the machine movable-side moving end area.

According to a second aspect of the articulated cable protection and guide apparatus of the invention, the stationary end-side connector unit comprises:
a plurality of synthetic resin block body stationary end-side retainers;
one of the synthetic resin block bodies extends out of one of the tubular storing portions of the flexible belt member proximate the plurality of synthetic resin block body stationary end-side retainers;
each of the synthetic resin block body stationary end-side retainers concavo-convexly engages with and retains the one of the synthetic resin block bodies extending out of the tubular storing portion of the flexible belt member proximate the plurality of synthetic resin block body stationary end-side retainers;
a pair of cable clampers for clamping said cable or cables exposed out of said tubular storing portions of said flexible belt member;
a pair of clamping plates integrally securing and affixing the block body stationary end-side retainers and the cable clampers disposed in parallel in the belt width direction;
fixing means for affixing the pair of clamping plates to the machine frame-side stationary end area; and,
the moving end-side connector unit comprises:
a plurality of synthetic resin block body moving end-side retainers;
one of the synthetic resin block bodies of the articulated supporting members extends out of one of the tubular storing portions of the flexible belt member proximate one of the plurality of synthetic resin block body moving end-side retainers;
each of the synthetic resin block body stationary end-side retainers concavo-convexly engages with and retains the one of the synthetic resin block bodies extending out of one of the tubular storing portions of the flexible belt member proximate one of the plurality of synthetic resin block body moving end-side retainers;
a pair of cable clampers for clamping said cable or cables exposed out of said tubular storing portions of said flexible belt member;
a pair of clamping plates integrally securing and affixing the block body moving end-side retainers and the cable clampers disposed in parallel in the belt width direction; and,
fixing means for affixing the pair of clamping plates to the machine moving-side stationary end area.

According to a third aspect of the articulated cable protection and guide apparatus of the invention: each synthetic resin block body includes a front side surface region; each front side surface region of said synthetic resin block body includes a link pin; each synthetic resin block body includes a rear side surface region; each rear side surface region of the synthetic resin block body includes a link hole; and, each the link pin of the front side surface region of each the synthetic resin block body is concavo-convexly fitted into the link pin hole of the rear side surface region of a preceding synthetic resin block body.

According to a fourth aspect of the articulated cable protection and guide apparatus of the invention: one of the block body stationary end-side retainers includes a block front stopping portion that concavo-convexly engages with and stops the link pins of the front surface region of the synthetic resin block body; one the block body moving end-side retainers includes a block front stopping portion that concavo-convexly engages with and stops the link pins of the front side surface region of the synthetic resin block body; and, another one of the block body stationary end-side retainers includes block rear stop portions that concavo-convexly engage with and stops the link pin holes of the rear side surface region of the synthetic resin block body.

According to a fifth aspect of the articulated cable protection and guide apparatus of the invention: the clamping plates of the stationary end-side connector unit include s slide holes for moving one of the block body stationary end-side retainers in the belt width direction; the block body stationary end-side retainer of the stationary end-side connector unit includes projections, and, the projection slidably fits into the slide holes of the clamping plates of the stationary end-side connector unit; the clamping plates of the moving end-side connector unit includes slide holes for moving one of the block body moving end-side retainers in the belt width direction; the block body moving end-side retainer of the moving end-side connector unit includes projections, and, the projection slidably fits into the slide holes of the clamping plates of the moving end-side connector unit; and, the cable clampers of the stationary end-side connector unit include projections that slidably fit into the slide holes of the clamping plates of the stationary end-side connector unit; and, the cable clampers of the moving end-side connector unit include projections that slidably fit into the slide holes of the clamping plates of the stationary end-side connector unit.

According to a sixth aspect of the articulated cable protection and guide apparatus of the invention: each rear side surface region of the synthetic resin block body includes a tapered cutaway fitting portion provided continuously to the link pin hole for concavo-convexly and vertically fitting the link pin of the front side surface region of the next adjacent synthetic resin block body to the link pin hole of the rear side surface region.

According to a seventh aspect of the articulated cable protection and guide apparatus of the invention: the synthetic resin block body includes a straight posture keeping plane for maintaining the synthetic resin block bodies in a straight condition and a bending posture keeping plane for maintaining the synthetic resin block bodies in a bending condition.

According to an eighth aspect of the articulated cable protection and guide apparatus of the invention, the flexible belt member is molded out of synthetic resin materials.

It is noted here that the basic concept of the term "flexible belt member" of the invention means a belt-like long item that can take the straight and bending conditions arbitrarily and flexibly.

Advantageous Effects of the Invention

According to the first aspect of the invention, the articulated cable protection and guide apparatus comprises the articulated supporting members. Each of the articulated supporting members is composed of the large number of synthetic resin block bodies linked with each other. The linked bodies take the straight and bending postures. The flexible belt member includes the plurality of tubular storing portions through which the articulated supporting member or the cables are respectively inserted and stored. The articulated supporting members and cables are in parallel in the belt width direction. This arrangement enables the guiding of the cables within the plurality of tubular storing portions between the machine frame-side stationary end area and the movable-side moving end area. The cables may take the straight and bending postures and are supported by the articulated supporting members.

According to the first aspect of the invention, because the articulated supporting member is composed of the large number of synthetic resin block bodies linked with each other, the articulated supporting member can be obtained by linking the synthetic resin block bodies with each other without injection-molding-pieces one by one to stainless steel or a leaf spring as disclosed in the prior art described above.

Accordingly, it becomes possible to cut and connect the articulated supporting member easily corresponding to its desired usage as compared to a prior art flexible material, composing a supporting member formed of stainless steel that is hard to cut and connect. It becomes possible to remarkably reduce the number of parts compared to the prior art in which various long and short supporting members have to be stocked.

Because the flexible belt member is provided with the plurality of tubular storing portions for respectively inserting and storing the articulated supporting member or cables formed in parallel in the belt width direction, and because the cables are separately inserted and stored within the tubular storing portions without contacting the articulated supporting member, it is possible to guide the large number of cables neatly and stably while completely avoiding wear and damage of the cables otherwise caused by the articulated supporting member and avoiding entanglement that is otherwise prone to occur among the cables, C.

Because the apparatus further comprises the stationary end-side connector unit for integrally fixing each stationary end of the articulated supporting members, the cables and the flexible belt member to the machine frame-side stationary end area, it becomes easy to install the apparatus to the machine frame-side stationary end area.

Because the moving end-side connector unit for integrally fixing each moving end of the articulated supporting members, the cables and the flexible belt member to the movable-side moving end area, it becomes easy to install the apparatus to the movable-side moving end area.

The cables are securely fixed to the machine frame-side stationary end area and the movable-side moving end area through the stationary end-side connector unit and the moving end-side connector unit.

The cables are guided in a free span area between the machine frame-side stationary end area and the movable-side moving end area while flexibly and freely taking the straight and bending postures.

According to the second aspect of the articulated cable protection and guide apparatus of the invention is stated hereinafter.

The stationary end-side connector unit comprises: a plurality of synthetic resin block body stationary end-side retainers; one of the synthetic resin block bodies extends out of one of the tubular storing portions of the flexible belt member proximate the plurality of synthetic resin block body stationary end-side retainers; each of the synthetic resin block body stationary end-side retainers concavo-convexly engages with and retains the one of the synthetic resin block bodies extending out of the tubular storing portion of the flexible belt member proximate the plurality of synthetic resin block body stationary end-side retainers; a pair of cable clampers; a pair of clamping plates integrally securing and affixing the block body stationary end-side retainers; the pair of clamping plates integrally securing and affixing the cable clampers thus securing the cable or cables; the synthetic resin block body stationary end-side retainers and the cable clampers disposed in parallel in the belt width direction; fixing means for affixing the pair of clamping plates to the machine frame-side stationary end area.

The moving end-side connector unit comprises: a plurality of synthetic resin block body moving end-side retainers; one of the synthetic resin block bodies of the articulated supporting members extends out of one of the tubular storing portions of the flexible belt member proximate one of the plurality of synthetic resin block body moving end-side retainers; each of the synthetic resin block body stationary end-side retainers concavo-convexly engages with and retains the one of the synthetic resin block bodies extending out of one of the tubular storing portions of the flexible belt member proximate one of the plurality of synthetic resin block body moving end-side retainers; a pair of cable clampers; a pair of clamping plates integrally securing and affixing the block body moving end-side retainers; the pair of clamping plates integrally securing and affixing the cable clampers; and the synthetic resin block body moving end-side retainers disposed in parallel in the belt width direction; and, fixing means for affixing the pair of clamping plates to the machine moving-side stationary end area.

According to the third aspect of the articulated cable protection and guide apparatus of the invention because the link pin provided at the front side surface region of each synthetic resin block body composing the articulated supporting member fits with the link pin hole provided at the rear side surface region of the preceding synthetic resin block body, the link pin of the succeeding synthetic resin block body is axially and rotatably supported by the link pin hole of the preceding synthetic resin block body.

Accordingly, the synthetic resin block bodies of the articulated supporting member can guide the cables by smoothly shifting from the straight posture to the bending posture or from the bending posture to the straight posture.

According to the fourth aspect of the articulated cable protection and guide apparatus of the invention: one of the block body stationary end-side retainers includes a block front stopping portion that concavo-convexly engages with and stops the link pins of the front surface region of the synthetic resin block body; one the block body moving end-side retainers includes a block front stopping portion that concavo-convexly engages with and stops the link pins of the front side surface region of the synthetic resin block body; and, another one of the block body stationary end-side retainers includes block rear stop portions that concavo-convexly engage with and stops the link pin holes of the rear side surface region of the synthetic resin block body.

Accordingly, it becomes possible to connect and retain the articulated supporting member composed of the large number of synthetic resin block bodies linked with each other integrally with the block body stationary end-side retainer and the block body moving end-side retainer.

According to the fifth aspect of the articulated cable protection and guide apparatus of the invention: the clamping plates of the stationary end-side connector unit include slide holes for moving one of the block body stationary end-side retainers in the belt width direction; the block body stationary end-side retainer of the stationary end-side connector includes projections, and, the projection slidably fits into the slide holes of the clamping plates of the stationary end-side connector unit; the clamping plates of the moving end-side connector unit includes slide holes for moving one of the block body moving end-side retainers in the belt width direction; the block body moving end-side retainer of the moving end-side connector includes projections, and, the projection slidably fits into the slide holes of the clamping plates of the moving end-side connector unit; and, the cable clampers of the stationary end-side connector unit include projections that slidably fit into the slide holes of the clamping plates of the stationary end-side connector unit; and, the cable clampers of the moving end-side connector unit include projections that slidably fit into the slide holes of the clamping plates of the stationary end-side connector unit.

Accordingly, it becomes possible to arbitrarily position and array the block body stationary end-side retainer, the block body moving end-side retainer and the cable clampers between the pair of clamping plates.

According to the sixth aspect of the articulated cable protection and guide apparatus of the invention, because the synthetic resin block body is provided with the tapered cutaway fitting portion for concavo-convexly and vertically fitting the link pin of the front side surface region to the link pin hole of the rear side surface region concavely and continuously to the link pin hole of the rear side surface region, the link pin of the succeeding synthetic resin block body can be attached to the link pin hole of the preceding synthetic resin block body via the tapered cutaway fitting portion thereof without requiring excessive fitting force in cutting and connecting the synthetic resin block bodies of the articulated supporting member.

According to the seventh aspect of the articulated cable protection and guide apparatus of the invention, because the synthetic resin block body is provided with the straight posture keeping plane for keeping the synthetic resin block bodies in the straight condition and because the bending posture keeping plane for keeping the synthetic resin block bodies in the bending condition, the straight posture keeping plane and the bending posture keeping plane position retain the articulated supporting member in the straight and bending postures required to the articulated supporting member.

Accordingly, it becomes possible to securely protect and guide the cables that take the bending posture and the straight posture even in an installation space having nearby obstacles.

According to the eighth aspect of the articulated cable protection and guide apparatus of the invention, because the flexible belt member is molded out of synthetic resin materials, it becomes possible to easily work and mold the shape of the tubular storing portions composing the flexible belt member.

Accordingly, it becomes possible not only to produce the light-weight flexible belt member corresponding to shapes of the cables, but also to reduce sliding abrasion that is prone to be caused between the flexible belt member and the cables. The synthetic resin material of the flexible belt member is self-lubricating.

BEST MODE FOR CARRYING OUT THE INVENTION

Embodiment

An embodiment of an articulated cable protection and guide apparatus of the invention will be explained with reference to FIGS. 1 through 12.

Figure 1:
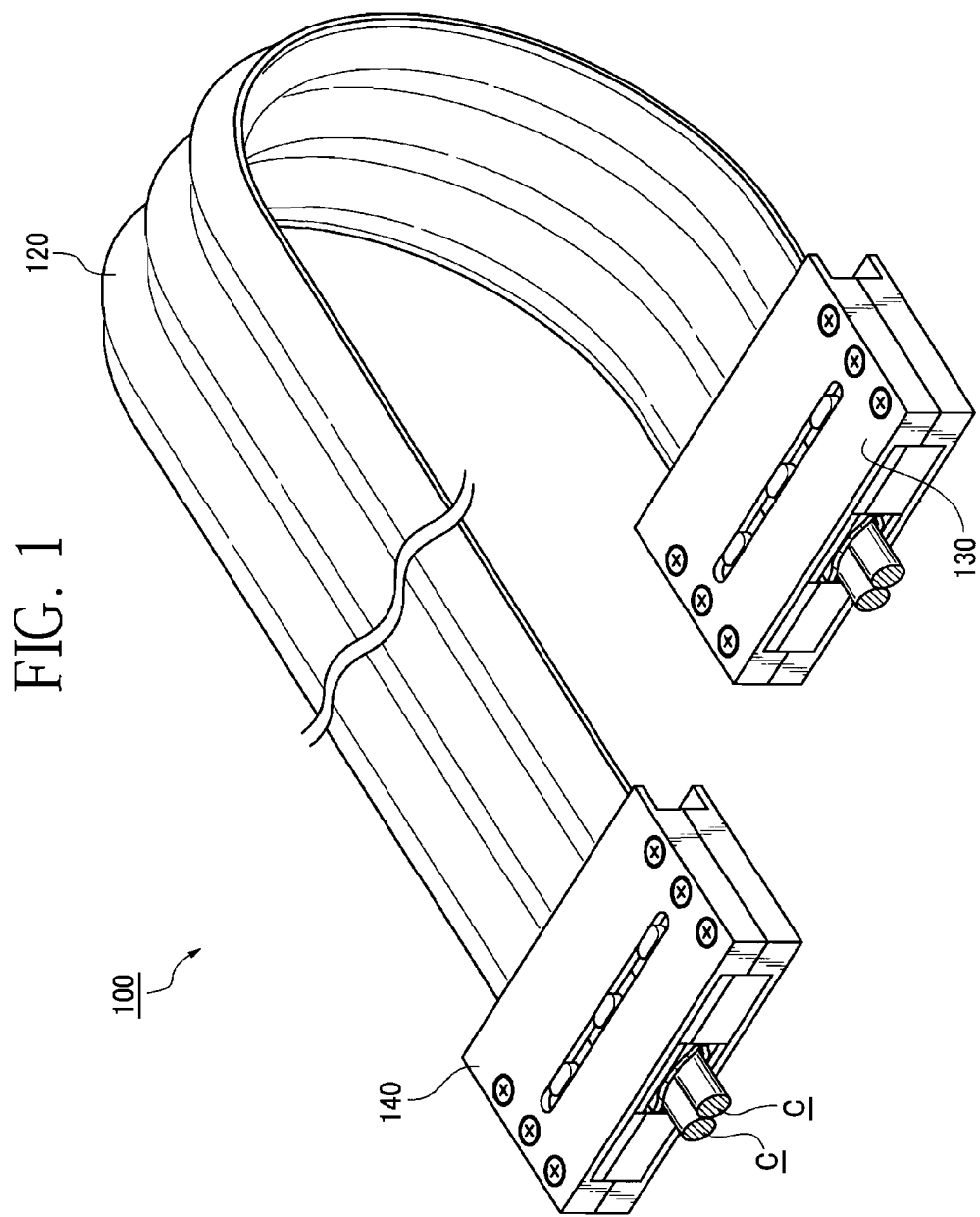
FIG. 1 is a schematic drawing of an articulated cable protection and guide apparatus of a first embodiment of the invention.
Figure 2:
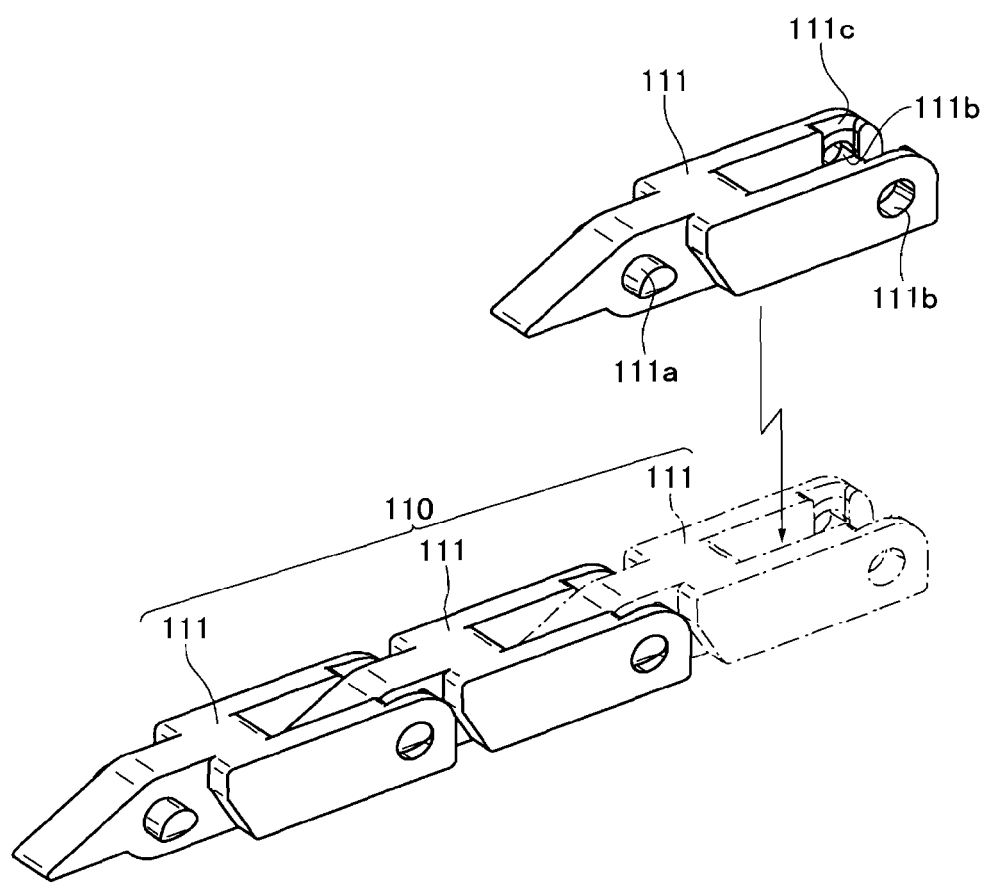
FIG. 2 is an assembly and exploded view of an articulated supporting member used in the invention.
Figure 3:
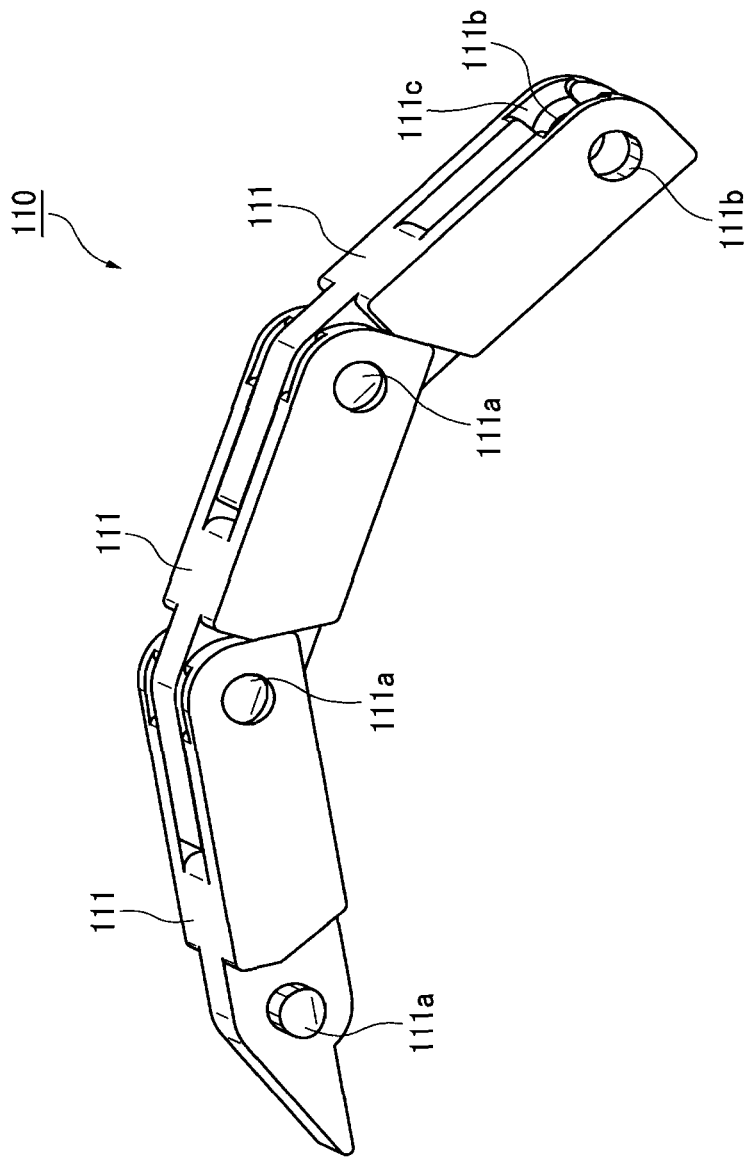
FIG. 3 is a perspective view showing a bending condition of the articulated supporting member shown in FIG. 2.
Figure 4:
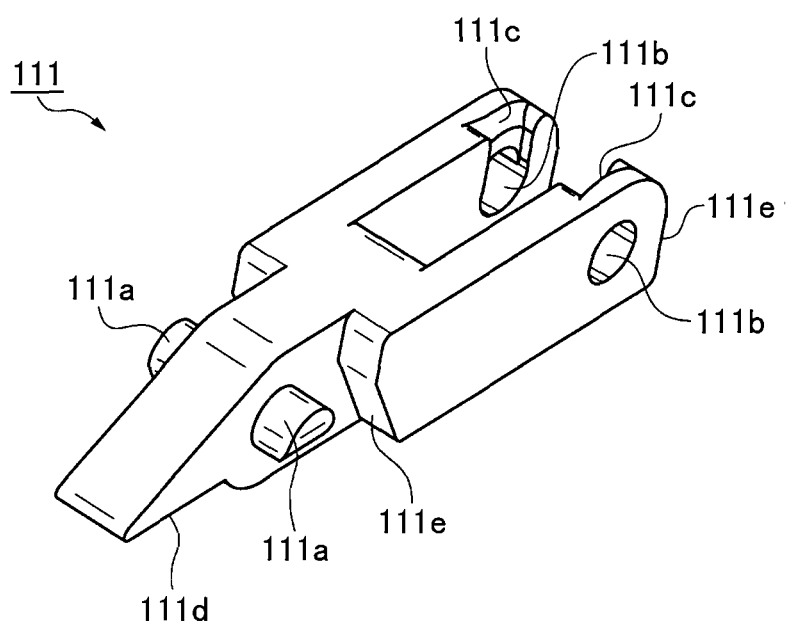
FIG. 4 is a perspective view of a synthetic resin block body shown in FIG. 2 seen from an obliquely front upper side.
Figure 5:
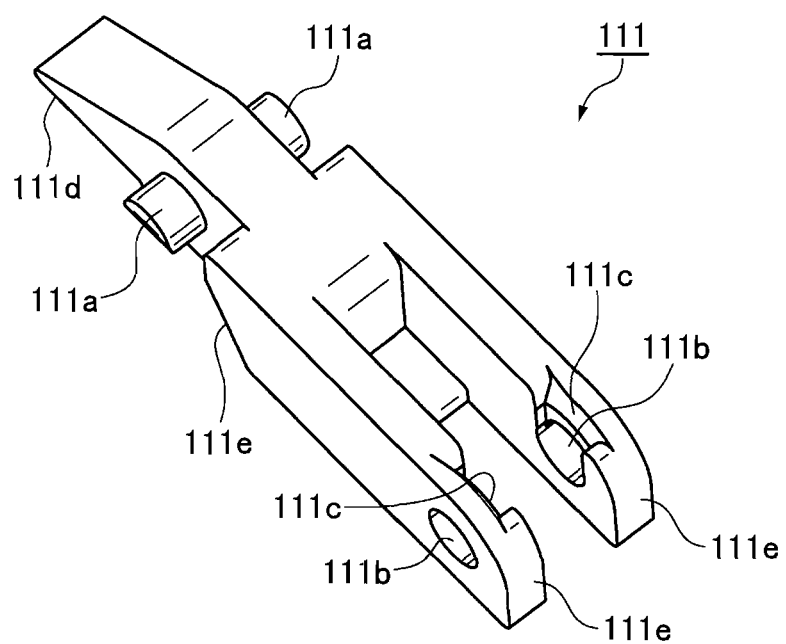
FIG. 5 is a perspective view of the synthetic resin block body shown in FIG. 2 seen from an obliquely rear upper side.
Figure 6:
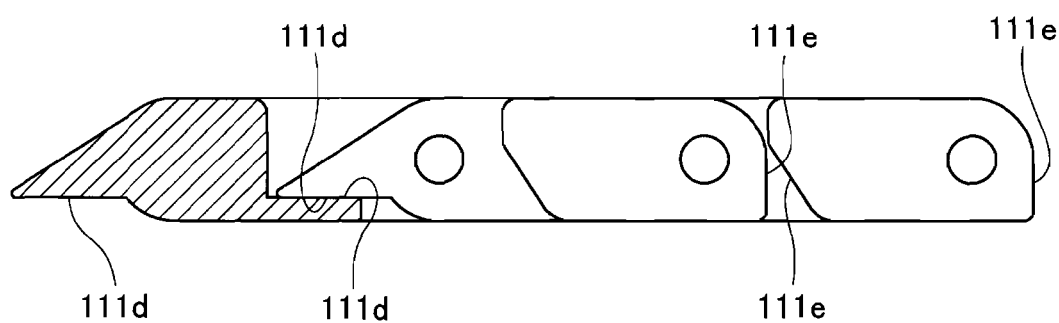
FIG. 6 is a side view showing a straight condition of the articulated supporting member shown in FIG. 2.
Figure 7:
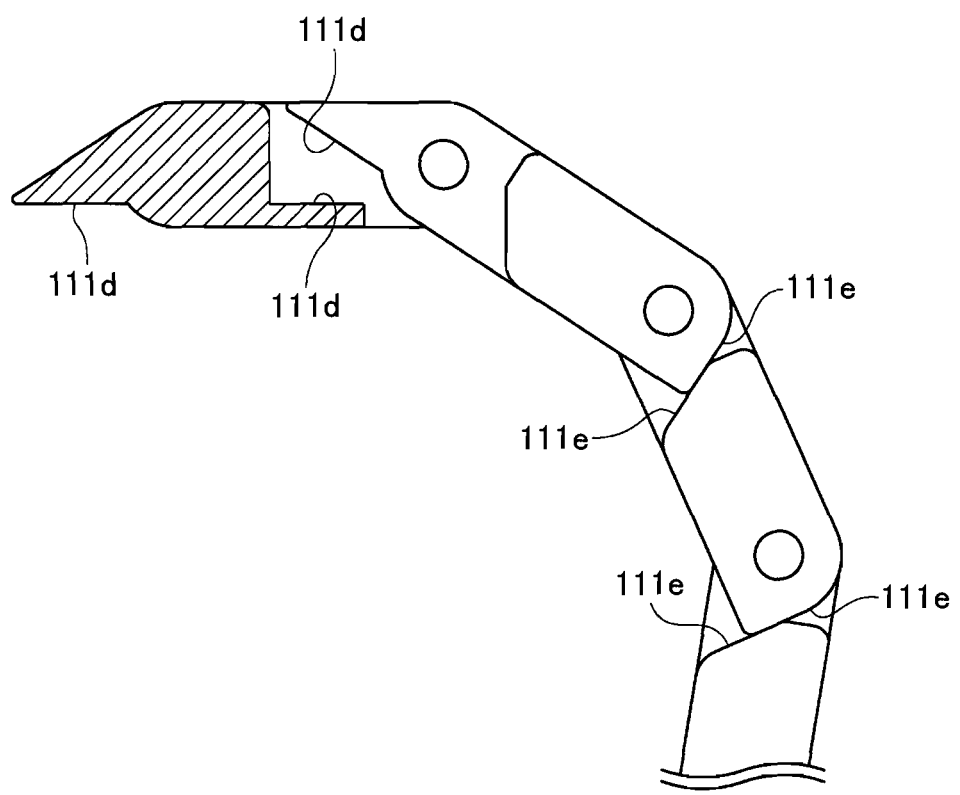
FIG. 7 is a side view showing a bending condition of the articulated supporting member shown in FIG. 2.
Figure 8:
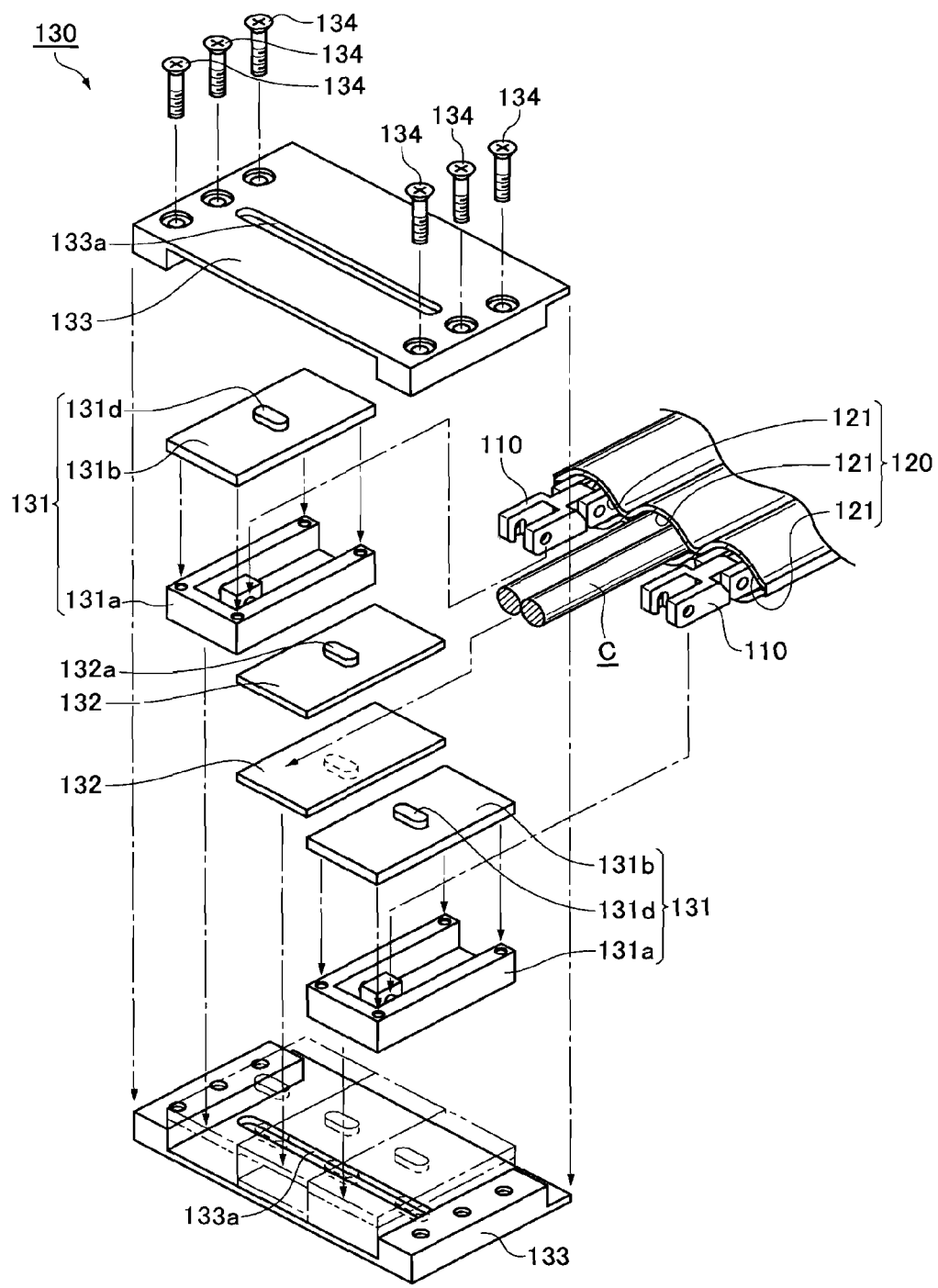
FIG. 8 is an assembly and exploded view of a stationary end-side connector used in the invention.
Figure 9:
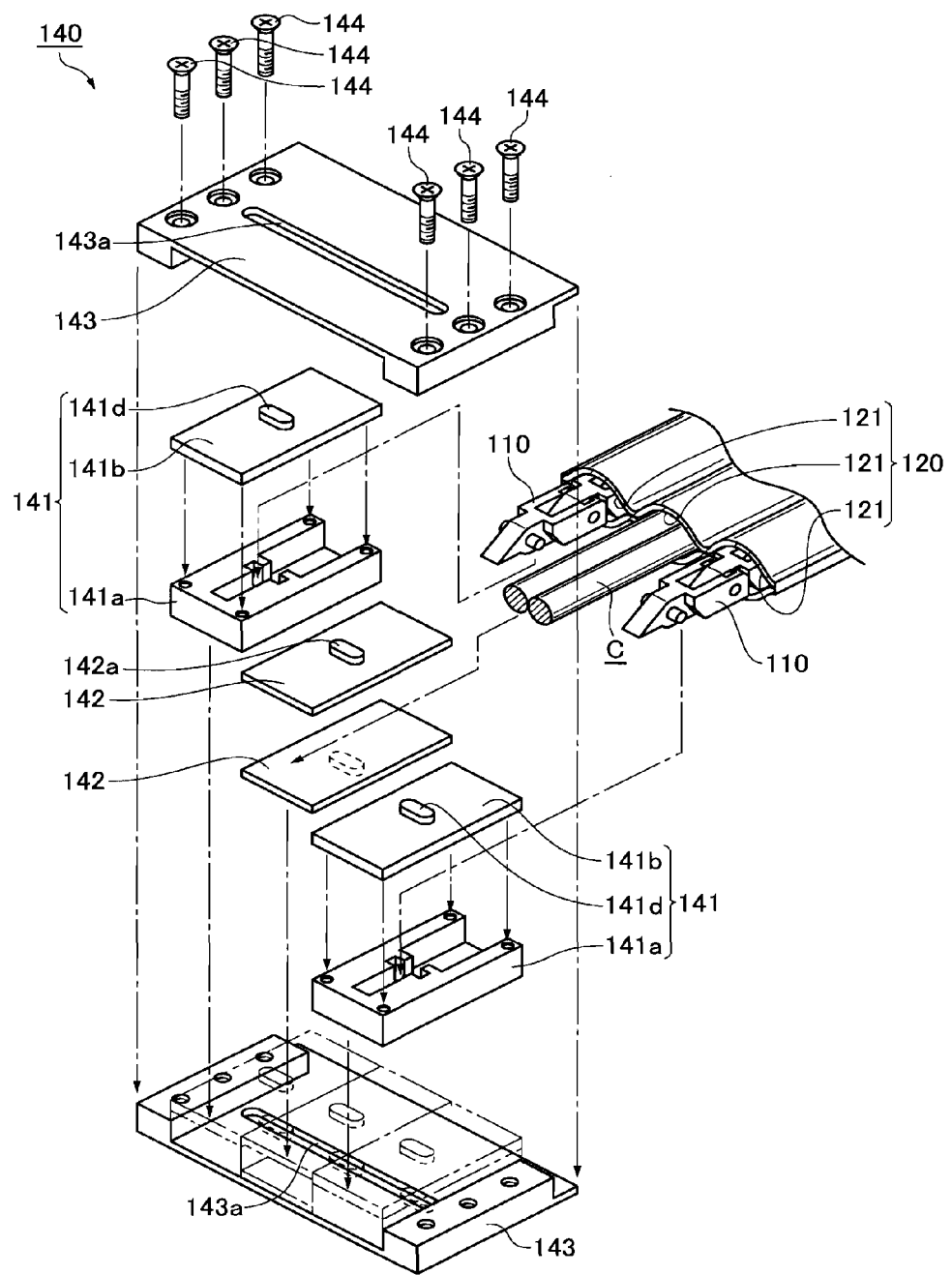
FIG. 9 is an assembly and exploded view of a moving end-side connector unit used in the invention.
Figure 10:
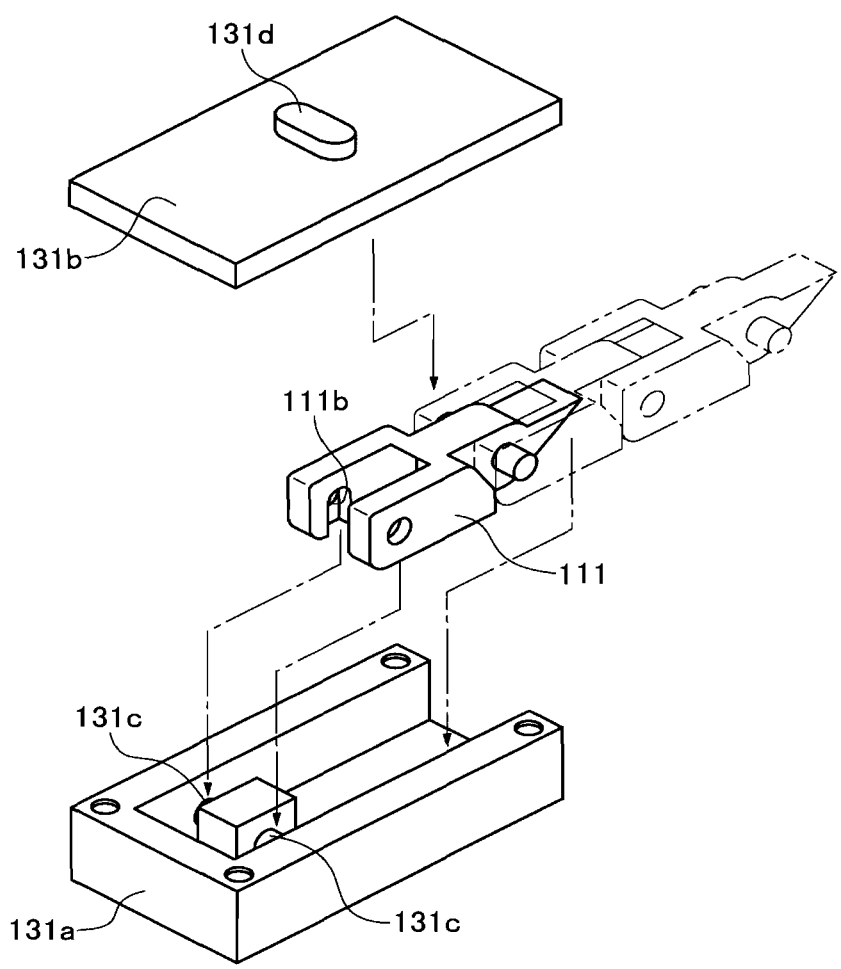
FIG. 10 is a perspective view showing a state in which the synthetic resin block body is connected with a block body stationary end-side retainer.
Figure 11:
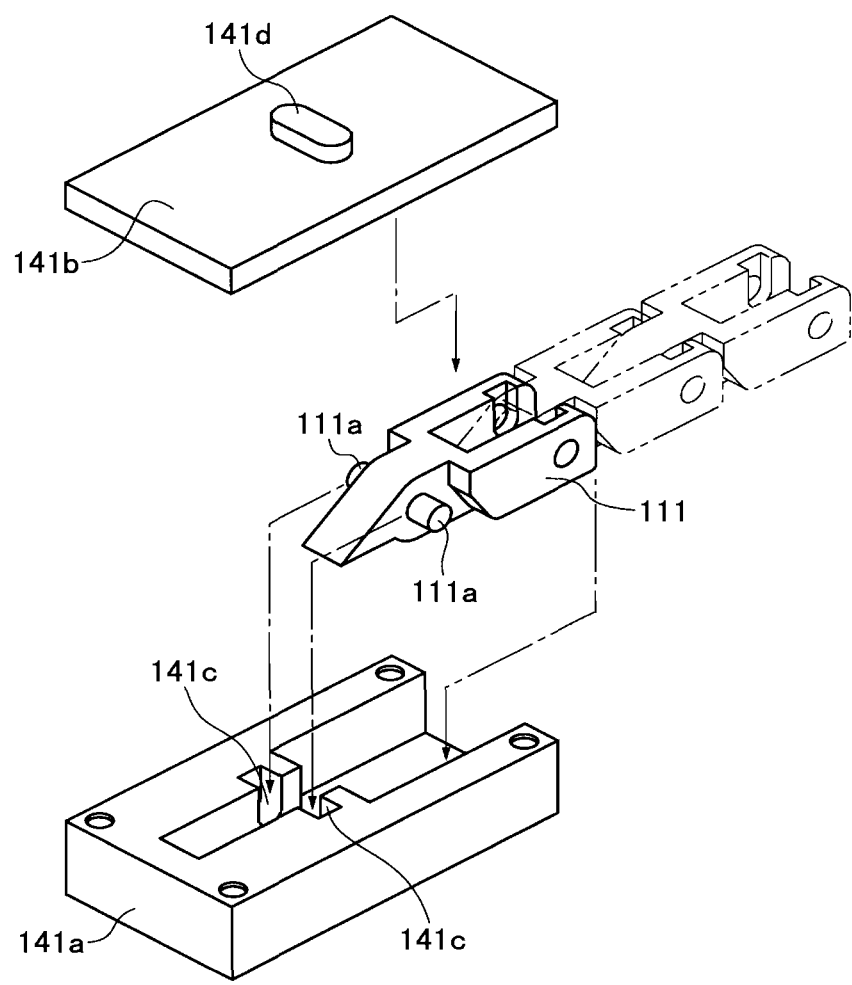
FIG. 11 is a perspective view showing a state in which the synthetic resin block body is connected with the block body moving end-side retainer.
Figure 12:
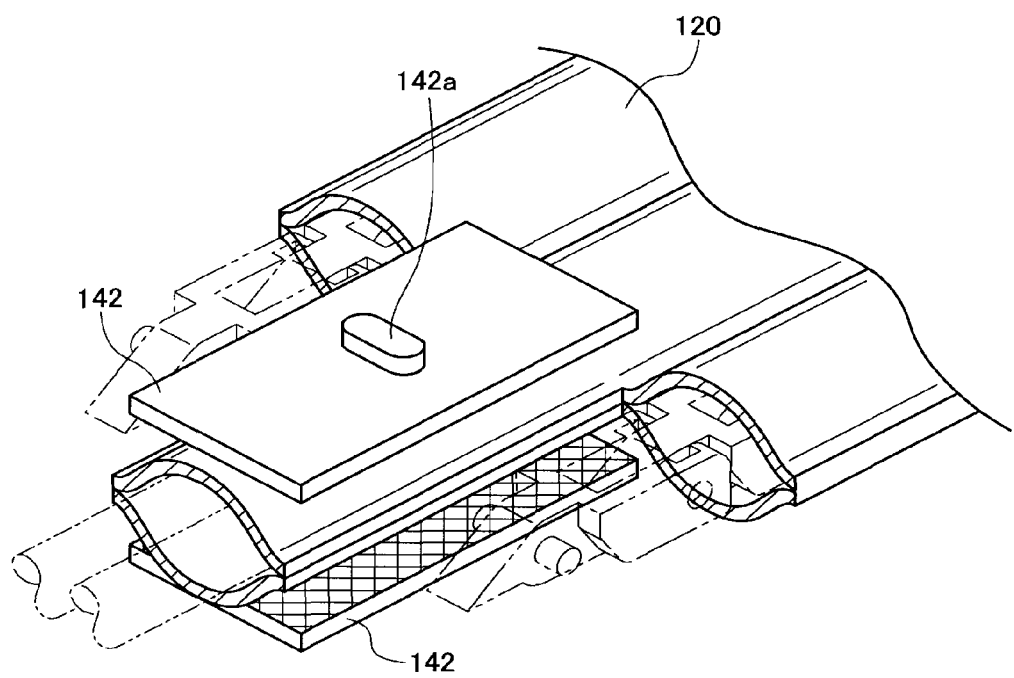
FIG. 12 is a perspective view showing a state in which a cable or cables are secured using a clamper.

FIG. 1 is a schematic drawing of an articulated cable protection and guide apparatus of a first embodiment of the invention. FIG. 2 is an assembly and exploded view of an articulated supporting member used in the invention. FIG. 3 is a perspective view showing a bending condition of the articulated supporting member shown in FIG. 2. FIG. 4 is a perspective view of a synthetic resin block body shown in FIG. 2 seen from an obliquely front upper side. FIG. 5 is a perspective view of the synthetic resin block body shown in FIG. 2 seen from an obliquely rear upper side. FIG. 6 is a side view showing a straight condition of the articulated supporting member shown in FIG. 2. FIG. 7 is a side view showing a bending condition of the articulated supporting member shown in FIG. 2. FIG. 8 is an assembly and exploded view of a stationary end-side connector used in the invention. FIG. 9 is an assembly and exploded view of a moving end-side connector unit used in the invention. FIG. 10 is a perspective view showing a state in which the synthetic resin block body is connected with a block body stationary end-side retainer. FIG. 11 is a perspective view showing a state in which the synthetic resin block body is connected with the block body moving end-side retainer. FIG. 12 is a perspective view showing a state in which cable or cables are connected with a cable clamper.

As shown in FIG. 1, the articulated cable protection and guide apparatus 100 of the embodiment of the invention protects and guides flexible cables and hoses such as electric cables, optical fiber cables and fluid supplying hoses (referred to as 'cables C' hereinafter) used for machine tools, electronic devices, industrial robots, transportation machines and others to feed power, fluid, and air to those moving machines or to a mobile part of the machines.

As shown in FIG. 1, the articulated cable protection and guide apparatus 100 of the embodiment of the invention comprises articulated supporting members 110. Each of the articulating supporting members is composed of a large number of synthetic resin block bodies 111 linked with each other and which take straight and bending postures. A flexible belt member 120 includes a plurality of tubular storing portions 121 through which the articulated supporting members 110 or cables, C, are respectively inserted and stored in parallel in a belt width direction. A stationary end-side connector unit 130 for fixing each stationary end of the articulated supporting members 110, the cable or cables, C, and the flexible belt member 120 to a machine frame-side stationary end area is illustrated in FIG. 1. Additionally, a moving end-side connector unit 140 for fixing each articulated cable protection and guide apparatus of the articulated supporting member 110, the cable or cables C, and the flexible belt member 120 to a movable-side moving end area is illustrated in FIG. 1.

The articulated supporting member 110 described above is composed of only the large number of synthetic resin block bodies 111 that fit concavo-convexly with each other and that are flexibly linked as shown in FIGS. 2 and 3.

Thereby, the articulated supporting member 110 can be obtained by linking the synthetic resin block bodies 111 with each other without injection-molding pieces one by one to stainless steel or a leaf spring as disclosed in the prior art supporting member described above. The number of parts composing the articulated supporting member 110 is reduced compared to the prior art case in which various long and short supporting members have to be stocked corresponding to usage requirements.

Next, the articulated supporting members 110 are inserted and stored respectively in the tubular storing portions 121 arrayed on the both lateral sides in the belt width direction of the flexible belt member 120 as shown in FIG. 1. One articulated supporting member is inserted per tubular storing portions 121.

Thereby, the articulated supporting members 110 keep the flexible belt member 120 in a laterally well-balanced manner without causing torsion or deflection on both sides in the belt width direction of the flexible belt member 120 during operation between the straight and bending postures.

Still more, as shown in FIGS. 3 through 5, a link pin 111a provided at a front side surface region of the synthetic resin block body 111 fits concavo-convexly with a link pin hole 111b provided at a rear side surface region of a preceding synthetic resin block body 111 and is linked so that the both synthetic resin block bodies can be rotated with respect to each other.

Thus, the link pin 111a of the succeeding synthetic resin block body 111 is pivotably supported by the link pin hole 111b of the preceding synthetic resin block body 111.

Furthermore, as shown in FIGS. 4 and 5, a tapered cutaway fitting portion 111c for concavo-convexly fitting the link pin 111a of the front side surface region to the link pin hole 111b of the rear side surface region in the vertical direction is concavely provided continuously to the link pin hole 111b of the rear side surface region.

Thereby, the link pin 111a of the succeeding synthetic resin block body 111 can be attached to the link pin hole 111b of the preceding synthetic resin block body 111 via the tapered cutaway fitting portion 111c thereof without requiring excessive fitting force in cutting and connecting the synthetic resin block bodies 111 of the articulated supporting member 110.

The synthetic resin block body 111 is provided with a straight posture keeping plane 111d for keeping the synthetic resin block bodies 111 in a straight condition and a bending posture keeping plane 111e for keeping the synthetic resin block bodies 111 in a bending condition as shown in FIGS. 6 and 7.

Thereby, the straight posture keeping plane 111d and the bending posture keeping plane 111e position and retain the articulated supporting member 110 in the straight and bending postures as required.

It is noted that the synthetic resin block body 111 described above has a substantially rectangular section whose four corners are chamfered along a longitudinal direction thereof. The chamfering of the corners thereby renders the rectangular section to, in effect, be somewhat circumferential in cross-section.

Thereby, the circumferential four corners of the synthetic resin block body 111 are not caught within the tubular storing portion 121 even if the synthetic resin block bodies 111 are displaced, relatively, up and down and left and right within the tubular storing portion 121 of the flexible belt member 120. Thus, the articulated supporting member 110 composed of the large number of linked synthetic resin block bodies 111 takes the bending and straight postures smoothly within the tubular storing portion 121 of the flexible belt member 120.

The synthetic resin block bodies 111 are molded by glass-fiber reinforced polyamide 66 resin.

Thereby, it becomes possible to readily mold the link pin 111a at the front side surface region, the link pin hole 111b at the rear side surface region, the tapered cutaway fitting portion 111c for concavo-convexly fitting the link pin, the straight posture keeping plane 111d for keeping the straight condition, the bending posture keeping plane 111e for keeping the bending condition and other components composing the synthetic resin block body 111. It becomes also possible to easily produce the light-weight synthetic resin block bodies 111 that can be cut and connected corresponding usage requirements. The glass-fiber reinforced polyamide 66 resin exhibits its self-lubricant effect, so that the link pin 111a is smoothly turned with respect to the link pin hole 111b at the axial support portion and the power required for shifting between the bending posture and the straight posture is considerably reduced.

The flexible belt member 120 used in the articulated cable protection and guide apparatus 100 of the present embodiment is molded out of synthetic resin materials.

Thereby, the shape of the tubular storing portions 121 composing the flexible belt member 120 can be readily processed and molded.

Although not shown in FIGS. 1 and 2, the flexible belt member 120 is formed by using two sheets. Each sheet includes fluororesin layers laminated on both front and back surfaces of a polyurethane resin layer. Tubular storing portions 121 for inserting the cable or cables C are integrally molded between the two sheets that bulge to the front and back surfaces of the sheets.

Thereby, the polyurethane resin layer provides elasticity and enables the flexible belt member 120 to bend. The self-lubricating effect of the fluororesin layers renders the cable or cables to slide with respect to the flexible belt member 120 thus protecting the cable or cables C.

Specific configurations of the stationary end-side connector unit 130 and the moving end-side connector unit 140, which are the most characteristic parts of the invention, will now be explained in detail.

As shown in FIG. 8, the stationary end-side connector unit 130 comprises block body stationary end-side retainers 131. Each of the retainers 131 concavo-convexly engages with and retains: the synthetic resin block body 111 exposed out of the tubular storing portion 121 of the flexible belt member 120; cable clampers 132 such as synthetic rubber mats for clamping the cable or cables exposed out of the tubular storing portions 121 of the flexible belt member 120 in a non-slippery condition; a pair of clamping plates 133 for integrally clamping and fixing the block body stationary end-side retainers 131; the cable clampers 132 disposed therein in parallel in the belt width direction; and, fixing means 134 such as hexagonal bolts for fixing the pair of clamping plates 133 to the machine frame-side stationary end area. Reference numeral 131d is a projection which resides in slide hole 133a when the stationary end-connector 130 is assembled.

The structure of the invention enables maintenance of the cables and the articulated supporting members separately. It becomes also possible to fix and remove only the clamping plate 133 to and from the machine frame-side stationary end area.

The block body stationary end-side retainer 131 is composed of glass fiber reinforced polyamide 66 resin and comprises a rectangular parallelepiped retainer body 131a that concavo-convexly engages with the synthetic resin block body 111 and a lid 131b that fits with the retainer body 131a as shown in FIG. 10. The retainer body 131a has block rear stopping portions 131c that concavo-convexly engage with and stop link pin holes 111b provided on rear side surface regions of the synthetic resin block body 111.

When the synthetic resin block body 111 extends and is exposed out of the tubular storing portion 121 of the flexible belt member 120, it is connected with the block body stationary end-side retainer 131. The block body stationary end-side retainer 131 reliably stops the synthetic resin block body 111 by utilizing the link pin holes 111b for linking the synthetic resin block bodies 111 with each other. That is, when the block rear stopping portions 131c are concavo-convexly and vertically fitted into the link pin holes 111b via the tapered cutaway fitting portion 111c, the synthetic resin block body 111 is stopped without being pulled out in the longitudinal direction.

The clamping plate 133 of stationary end-side connector unit 130 is made of aluminum and has a slide hole (groove) 133a for moving the block body stationary end-side retainer 131 and the cable clamper 132 in the belt width direction as shown in FIG. 8. The block body stationary end-side retainer 131 and the cable clamper 132 include projections 131d and 132a, respectively, which slidably fit into the slide hole (groove) 133a of the clamping plate 133.

Thereby, the retainer body 131a of the block body stationary end-side retainer 131 and the projection 132a of the cable clamper 132 move in the belt width direction along the slide hole (groove) 133a of the clamping plate 133, so that it becomes possible to arbitrarily position the block body stationary end-side retainer 131 and the cable clamper 132 between the pair of clamping plates 133.

Meanwhile, as shown in FIG. 9, the moving end-side connector unit 140 comprises block body moving end-side retainers 141. Each moving end-side retainer concavo-convexly engages with and retains:
 the synthetic resin block body 111 exposed out of the tubular storing portion 121 of the flexible belt member 120;
 cable clampers 142 such as synthetic rubber mats for clamping the cable or cables exposed out of the tubular storing portions 121 of the flexible belt member 120 in the non-slippery condition;
 a pair of clamping plates 143 for integrally clamping and fixing the block body moving end-side retainers 141;
 the cable clampers 142 disposed therein in parallel in the belt width direction; and,
 fixing means 144 such as hexagonal bolts for fixing the pair of clamping plates 143, to the movable-side moving end area.

Thereby, it becomes possible to connect and retain the cable or cables to the cable clampers 142 separately from the articulated supporting members 110 during maintenance thereof. It becomes also possible to fix and remove only the clamping plate 143 to and from the movable-side moving end area.

The block body moving end-side retainer 141 is composed of the glass fiber reinforced polyamide 66 resin and comprises:
 a rectangular parallelepiped retainer body 141a that concavo-convexly engages with the synthetic resin block body 111; and,
 a lid 141b that fits with the retainer body 141a as shown in FIG. 11.

The retainer body 141a has block front stopping portions 141c that concavo-convexly engage with stop link pins 111a provided on front side surface regions of the synthetic resin block body 111.

Thereby, when the synthetic resin block body 111 extends our of, and is exposed out of, the tubular storing portion 121 of the flexible belt member 120 is connected with the block body stationary end-side retainer 131, the block body stationary end-side retainer 131 reliably stops the synthetic resin block body 111 by utilizing the link pins 111a for linking the synthetic resin block bodies 111 with each other. That is, when the link pins 111a are concavo-convexly and vertically fitted into the block front stopping portions 141c, the synthetic resin block body 111 is stopped without being pulled out in the longitudinal direction.

The clamping plate 143 of the moving end-side connector unit 140 is made of aluminum and has a slide hole (groove) 143a for moving the block body moving end-side retainer 141 and the cable clamper 142 in the belt width direction as shown in FIG. 9. The block body moving end-side retainer 141 and the cable clamper 142 have projections 141d and 142a, respectively, which slidably fit into the slide hole (groove) 143a of the clamping plate 143.

Thereby, the projection 141d of the block body moving end-side retainer 141 and the projection 142a of the cable clamper 142 move in the belt width direction along the slide hole 143a of the clamping plate 143, so that it becomes possible to arbitrarily position the block body moving end-side retainer 141 and the cable clamper 142 between the pair of clamping plates 143.

Cable clampers 142 composed of the synthetic resin grip the cable or cables C as shown in FIG. 12.

Thereby, the cable clampers 142 position the cable or cables C without slippage and deformation of the cable or cables. In this way, damage of the cables, even when fastening force of the clamping plates 143 is excessively large, is prevented.

Because the articulated cable protection guide apparatus 100 of the invention thus obtained is provided with the stationary end-side connector unit for integrally fixing each stationary end of the articulated supporting members, the cable or cables, and the flexible belt member to the machine frame-side stationary end area, it becomes easy to install the apparatus 100 to the machine frame-side stationary end area. And because the articulated cable protection guide apparatus 100 of the invention thus obtained is provided with the moving end-side connector unit for integrally fixing each moving end of the articulated supporting members, the cable or cables, and the flexible belt member to the machine movable-side movable end area, it becomes easy to install the apparatus 100 to the machine movable side end area.

The disclosed structure enables guiding of the cable or cables between a free span area between the machine frame-side stationary end area and the movable-side moving end area while flexibly and freely taking the straight and bending postures.

The stationary end-side connector unit 130 comprises the block body stationary end-side retainers 131. Each of the stationary end-side connector units concavo-convexly engages with and retains:
 the synthetic resin block body 111;
 the cable clampers 132 for clamping the cable or cables C;
 the pair of clamping plates 133 for integrally clamping and fixing the block body stationary end-side retainers 131;
 the fixing means 134 for fixing the pair of clamping plates 133 to the machine frame-side stationary end area.

The moving end-side connector unit 140 comprises the block body moving end-side retainers 141. Each of the moving end-side retainers 141 concavo-convexly engages with and retains:

the synthetic resin block body 111;

the cable clampers 142 for clamping the cable or cables C in the non-slippery condition;

the pair of clamping plates 143 for integrally clamping and fixing the block body moving end-side retainers 141 and the cable clampers 142; and, the fixing means 144 for fixing the pair of clamping plates 143 to the movable-side moving end area.

Because of the aforementioned structure it becomes possible to perform the decomposing and assembling works of the stationary end-side connector unit 130 or the moving end-side connector unit 140 easily and swiftly.

Because the block body stationary end-side retainer 131 has the block rear stopping portions 131c that concavo-convexly engage with and stop the link pin holes 111b provided on the rear side surface regions of the synthetic resin block body 111, and because the block body moving end-side retainer 141 has the block front stopping portions 141c that concavo-convexly engage with and stop the link pins 111a provided on the front side surface regions of the synthetic resin block body 111, it becomes possible to connect and retain the articulated supporting member 110 composed of the large number of synthetic resin block bodies 111 connected with each other integrally with the block body stationary end-side retainer 131 and the block body moving end-side retainer 141. Thus, the advantageous effects of the invention are remarkable.

The specific mode of the articulated cable protection and guide apparatus of the present invention may take any mode as long as the apparatus comprises:

the articulated supporting members, each articulated supporting members comprising a large number of synthetic resin block bodies linked with each other and which take the straight and bending postures; and, the flexible belt member in which the plurality of tubular storing portions through which the articulated supporting member or the cable or cables are respectively inserted and stored is formed in parallel in the belt width direction;

wherein the cable or cables are protected within the tubular storing portions of the flexible belt member and are guided between the machine frame-side stationary end area and the movable-side moving end area; and, wherein the apparatus further comprises: the stationary end-side connector unit for integrally fixing each stationary end of the articulated supporting members, the cable or cables, and the flexible belt member to the machine frame-side stationary end area; and, the moving end-side connector unit for integrally fixing each moving end of the articulated supporting members, the cable or cables, and the flexible belt member to the movable-side moving end area.

Thus, the apparatus reliably, stably and smoothly guides the cable or cables between the machine frame-side stationary end area and the movable-side moving end area, assures durability of the articulated supporting member that takes the straight and bending postures for a long period of time, and simplifies the decomposing and assembling works of the machine frame-side stationary end-side connector unit or the moving end-side connector unit.

For instance, the material of the flexible belt member used in the articulated cable protection and guide apparatus of the invention may be any synthetic resin material from which the plurality of tubular storing portions and others can be made. When fluororesin layers are laminated on the both front and back surfaces of an extensible layer, the extensible layer enables extensibility of the flexible belt member, and the fluororesin layer provides a flexible belt member with a low coefficient of friction.

Here, it is preferable to use PTFE (polytetrafluoroetylene) for the fluororesin layer of the flexible belt member because it has low friction and it is preferable to use polyurethane resin for the extensible layer.

Then, the specific configuration of the flexible belt member described above may comprise: the plurality of tubular storing portions equally parted in the belt width direction and having the circular cross-section; the plurality of tubular storing portions equally parted in the belt width direction and having the rectangular cross-section; and, the plurality of tubular storing portions parted equally in the belt width direction and having the vertically symmetrical wavy cross-sections.

The number of tubular storing portions provided in the flexible belt member may be any number as long as it is at least a plural number for respectively inserting and storing the articulated supporting member and the cable or cables. The number of the tubular storing portions in the flexible belt member is preferable to be equal to the number of cables so that one cable is inserted in each tubular storing portion preventing the cable or cables from contacting with each other.

The articulated supporting member used in the articulated cable protection and guide apparatus of the invention may configured specifically in any configuration as long as it is composed of the large number of synthetic resin block bodies flexibly linked by concavo-convexly fitting with each other.

The specific configuration of each synthetic resin block body may comprise:

flexibly linking the adjacent bodies by concavo-convexly fitting the link pin provided at the front side surface region of the synthetic resin block body to the link pin hole provided at the rear side surface region of the preceding synthetic resin block body; or, flexibly linking the adjacent bodies by concavo-convexly fitting the link pin provided at the rear side surface region of the synthetic resin block body to the link pin hole provided at the front side surface region of the preceding synthetic resin block body.

The former configuration is preferable in particular.

The specific material of the synthetic resin block body described above may be any synthetic resin material as long as it is cable of keeping:

the shapes of the link pin at the front side surface region;

the link pin hole at the rear side surface region;

the tapered cutaway fitting portion for concavo-convexly fitting the link pin;

the straight posture keeping plane for keeping the straight condition; and, the bending posture keeping plane for keeping the bending condition.

For example, it is preferable to adopt glass-fiber reinforced polyamide 66 resin, polyacetal resin and ABS resin. When the glass-fiber reinforced polyamide 66 resin is used in particular, rigidity and abrasion resistance of the articulated supporting member are improved. Therefore, the articulated supporting member can fully withstand long repetitive uses and can achieve a long life.

The articulated supporting members described above are inserted and stored respectively in the tubular storing portions arrayed on the both lateral sides of the flexible belt member, so that the articulated supporting members can keep the flexible belt member in a laterally well-balanced manner without causing torsion or deflection in the flexible belt member in taking the straight and bending postures. However, it is also possible to insert and store the articulated supporting member in a tubular storing portion arrayed at the center of the flexible belt member.

The specific modes of the stationary end-side connector unit and the moving end-side connector unit used in the articulated cable protection and guide apparatus of the invention may be any mode as long as each of them comprises the block body stationary end-side retainer or the block body moving end-side retainer, the cable clamper, the pair of clamping plates and the fixing means and fixes the articulated supporting members, the cable or cables and the flexible belt member integrally to the machine frame-side stationary end area or the movable-side moving end area. For instance, a number of the cable or cables, C, may be appropriately determined corresponding to a number of cable or cables to be guided and a widthwise dimension of the clamping plate.

Still more, the specific configuration of the block body stationary end-side retainer and the block body moving end-side retainer may be any configuration as long as they concavo-convexly engage with and retain the synthetic resin block body exposed out of the tubular storing portion of the flexible belt member.

For instance, the retainer comprises the two members of the rectangular parallelepiped retainer body that concavo-convexly engages with the synthetic resin block body and the lid that fits with this retainer body.

The block body stationary end-side retainer and the block body moving end-side retainer has the block front stopping portions that concavo-convexly engage with and stop the pair of right and left link pins provided on the front side surface regions of the synthetic resin block body in the link longitudinal direction. The block body stationary end-side retainer and the block body moving end-side retainer has the block rear stopping portions that concavo-convexly engage with and stop the pair of right and left link pin holes provided on the rear side surface regions of the synthetic resin block body in the link longitudinal direction. Thus, the retainer utilizes the link pins and the link pin holes that connect the synthetic resin block bodies with each other and reliably stop the synthetic resin block body.

The cable clampers may also have any configuration specifically as long as they clamp the cable or cables extending out of, and exposed out of the tubular storing portions of the flexible belt member. For instance, preferably, they are a pair of upper and lower flat plates composed of synthetic rubber and the like that are capable of clamping thin and thick cable or cables in the non-slip condition and are provided with the projections that slidably fit in the slide holes (grooves) of the pair of clamping plates and can be positioned respectively.

What is claimed is:

1. An articulated cable protection and guide apparatus, comprising:
  a cable or cables:
  said cable or cables are guided between a machine frame-side stationary end area and a machine movable-side moving end area;
  articulated supporting members;
  each of said articulated supporting members includes a stationary end and a moving end;
  each of said articulated supporting members includes a large number of synthetic resin block bodies linked with each other;
  said large number of synthetic resin block bodies linked with each other operate between straight and bending postures;
  a flexible belt member;
  said flexible belt member includes a width and a length;
  said flexible belt member includes a plurality of tubular storing portions;
  said articulated supporting members are inserted and stored in respective tubular storing portions;
  said cable or cables are inserted and stored in respective tubular storing portions;
  said articulated supporting members and said cables stored in said respective tubular storing portions are in parallel in said flexible belt member width direction;
  said cables are protected within said tubular storing portions of said flexible belt member and are guided between said machine frame-side stationary end area and said machine movable-side moving end area;
  a stationary end-side connector unit;
  a moving end-side connector unit;
  said stationary end-side connector unit integrally affixes each stationary end of said articulated supporting members, said cable or cables, and said flexible belt member to said machine frame-side stationary unit; and,
  said moving end-side connector unit integrally affixes each moving end of said articulated supporting members, said cable or cables, and said flexible belt member to said machine movable-side moving end area.

2. The articulated cable protection and guide apparatus according to claim 1, wherein said stationary end-side connector unit comprises:
  a plurality of synthetic resin block body stationary end-side retainers;
  one of said synthetic resin block bodies extends out of one of said tubular storing portions of said flexible belt member proximate said plurality of synthetic resin block body stationary end-side retainers;
  each of said synthetic resin block body stationary end-side retainers concavo-convexly engages with and retains said one of said synthetic resin block bodies extending out of said tubular storing portion of said flexible belt member proximate said plurality of synthetic resin block body stationary end-side retainers;
  a pair of cable clampers for clamping said cable or cables exposed out of said tubular storing portions of said flexible belt member;
  a pair of clamping plates integrally securing and affixing said block body stationary end-side retainers and said cable clampers disposed in parallel in the belt width direction; and,
  fixing means for affixing said pair of clamping plates to said machine frame-side stationary end area; and,
  said moving end-side connector unit comprises:
  a plurality of synthetic resin block body moving end-side retainers;
  one of said synthetic resin block bodies of said articulated supporting members extends out of one of said tubular storing portions of said flexible belt member proximate one of said plurality of synthetic resin block body moving end-side retainers;
  each of said synthetic resin block body stationary end-side retainers concavo-convexly engages with and retains said one of said synthetic resin block bodies extending out of one of said tubular storing portions of said flexible belt member proximate one of said plurality of synthetic resin block body moving end-side retainers;

a pair of cable clampers for clamping said cable or cables exposed out of said tubular storing portions of said flexible belt member;

a pair of clamping plates integrally securing and affixing said block body moving end-side retainers and said cable clampers disposed in parallel in the belt width direction; and, fixing means for affixing said pair of clamping plates to said machine moving-side stationary end area.

3. The articulated cable protection and guide apparatus according to claim 1, wherein:

each synthetic resin block body includes a front side surface region;

each front side surface region of said synthetic resin block body includes a link pin;

each synthetic resin block body includes a rear side surface region;

each rear side surface region of said synthetic resin block body includes a link hole; and, each said link pin of said front side surface region of each said synthetic resin block body is concavo-convexly fitted into said link pin hole of said rear side surface region of a preceding synthetic resin block body.

4. The articulated cable protection and guide apparatus according to claim 3, wherein:

one of said block body stationary end-side retainers includes a block front stopping portion that concavo-convexly engages with and stops said link pins of said front surface region of said synthetic resin block body;

one of said block body moving end-side retainers includes a block front stopping portion that concavo-convexly engages with and stops said link pins of said front side surface region of said synthetic resin block body; and, another one of said block body stationary end-side retainers includes block rear stop portions that concavo-convexly engage with and stop said link pin holes of said rear side surface region of said synthetic resin block body.

5. The articulated cable protection and guide apparatus according to claim 3, wherein:

each rear side surface region of said synthetic resin block body includes a tapered cutaway fitting portion provided continuously to said link pin hole for concavo-convexly and vertically fitting said link pin of said front side surface region of said next adjacent synthetic resin block body to said link pin hole of said rear side surface region.

6. The articulated cable protection and guide apparatus according to claim 1, wherein:

said synthetic resin block body includes a straight posture keeping plane for maintaining said synthetic resin block bodies in a straight condition and a bending posture keeping plane for maintaining said synthetic resin block bodies in a bending condition.

7. The articulated cable protection and guide apparatus according to claim 1, wherein:

said flexible belt member is molded out of synthetic resin materials.

* * * * *